US011072563B2

(12) United States Patent
Delwaulle et al.

(10) Patent No.: US 11,072,563 B2
(45) Date of Patent: Jul. 27, 2021

(54) MOLTEN ALUMINA-ZIRCONIA GRAINS

(71) Applicant: SAINT-GOBAIN CENTRE DE RECHERCHES ET D'ETUDES EUROPEEN, Courbevoie (FR)

(72) Inventors: Céline Delwaulle, Cavaillon (FR); Arnaud Apheceixborde, Cavaillon (FR)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 139 days.

(21) Appl. No.: 16/075,781

(22) PCT Filed: Feb. 10, 2017

(86) PCT No.: PCT/EP2017/053062
§ 371 (c)(1),
(2) Date: Aug. 6, 2018

(87) PCT Pub. No.: WO2017/137596
PCT Pub. Date: Aug. 17, 2017

(65) Prior Publication Data
US 2019/0031564 A1    Jan. 31, 2019

(30) Foreign Application Priority Data

Feb. 12, 2016 (FR) ...................................... 1651149

(51) Int. Cl.
*C04B 35/109* (2006.01)
*B24D 3/14* (2006.01)
*C09K 3/14* (2006.01)
*B24D 3/20* (2006.01)

(52) U.S. Cl.
CPC .............. *C04B 35/109* (2013.01); *B24D 3/14* (2013.01); *B24D 3/20* (2013.01); *C09K 3/1427* (2013.01); *C04B 2235/3201* (2013.01); *C04B 2235/3206* (2013.01); *C04B 2235/3208* (2013.01); *C04B 2235/3232* (2013.01); *C04B 2235/3241* (2013.01); *C04B 2235/3418* (2013.01)

(58) Field of Classification Search
CPC .......... C04B 35/109; C04B 2235/3201; C04B 2235/3206; C04B 2235/3208; C04B 2235/3232; C04B 2235/3241; C04B 2235/3418; B24D 3/14; B24D 3/20; C09K 3/1427
See application file for complete search history.

(56) References Cited

U.S. PATENT DOCUMENTS

| | | | |
|---|---|---|---|
| 3,181,939 A | 5/1965 | Marshall et al. | |
| 3,993,119 A | 11/1976 | Scott | |
| 4,035,162 A * | 7/1977 | Brothers | C09K 3/1427 51/298 |
| 4,049,397 A | 9/1977 | Bockstiegel et al. | |
| 5,143,522 A | 9/1992 | Gibson et al. | |
| 2012/0028544 A1* | 2/2012 | Marlin | C04B 35/109 451/28 |
| 2012/0124953 A1* | 5/2012 | Raffy | C04B 35/62665 55/523 |

FOREIGN PATENT DOCUMENTS

| | | | |
|---|---|---|---|
| CA | 1056605 A | 6/1979 | |
| FR | 2948657 A1 * | 2/2011 | ....... C04B 35/62665 |

OTHER PUBLICATIONS

Corresponding International Application, Application No. PCT/EP2017/053062, International Search Report, dated May 5, 2017, 4 pages.

* cited by examiner

*Primary Examiner* — Pegah Parvini
*Assistant Examiner* — Ross J Christie
(74) *Attorney, Agent, or Firm* — Cooper Legal Group, LLC; Ronald M. Kachmarik

(57) ABSTRACT

A fused grain having the following chemical composition in percent by weight in relation to the oxides: $ZrO_2$: 16% to 30%, provided that $HfO_2 < 2\%$, $Al_2O_3$: percentage needed to bring the total to 100%, $Cr_2O_3$: ≥0.2%, $TiO_2$: ≥0.5%, $Cr_2O_3 + TiO_2$: <7%, other elements: <3%, provided that $SiO_2 + CaO + MgO < 1.5\%$.

24 Claims, No Drawings

MOLTEN ALUMINA-ZIRCONIA GRAINS

TECHNICAL FIELD

The present invention relates to a fused ceramic grain, in particular for applications as abrasive grains. The invention also relates to a mixture of said grains and also to an abrasive tool comprising a mixture of grains in accordance with the invention.

PRIOR ART

Abrasive tools are generally classified according to the form in which the constituent ceramic grains thereof are formulated: free abrasives (use in spraying or in suspension, without a support), coated abrasives (support of cloth or paper type, where the grains are positioned over several layers) and bonded abrasives (for example in the form of circular grinding wheels or of sticks). In the latter cases, the abrasive grains are compressed with an organic or glass binder (in this case, a binder composed of oxides which is essentially silicated). These grains must themselves exhibit good mechanical properties in the abrasion (in particular toughness) and give rise to good mechanical cohesion with the binder (durability of the interface). Currently, various families of abrasive grains exist which make it possible to cover a broad range of applications and of performance: grains of oxides synthesized by fusion in particular offer an excellent quality/manufacturing cost compromise.

The alumina-based abrasive grains generally used in the manufacture of grinding wheels or of abrasive belts bring together three main categories according to the type of applications and of abrasion conditions encountered: fused alumina-based grains, fused grains based on alumina-zirconia and alumina-based grains obtained by the sol-gel process or by extrusion and sintering of abrasive pastes.

Within the range of fused grains, materials based on alumina and zirconia are known from U.S. Pat. No. 3,181,939. These grains are generally composed of from 10% to 60% of zirconia and from 0% to 10% of an additive, the remainder being alumina. Titanium oxide in a content of between 1.5% and 10%, according to the patent U.S. Pat. No. 5,143,522, or the oxides $R_2O_3$, R being chosen from vanadium, chromium, manganese, cobalt and their mixtures, in a content of between 0.1% and 12%, according to the patent U.S. Pat. No. 4,035,162, are known as additive.

It is usual to measure and to compare the abrasive performance qualities of different grains by the ratio of the weight of machined steel divided by the weight of abrasive grains consumed during said machining, known here as S ratio, and also by the maximum power developed by the tool during the machining, known here as $P_{max}$, and the lifetime of the tool, known here as $t_{max}$.

Machining Conditions are Increasingly Severe.

There thus exists a need for a mixture of abrasive fused alumina-zirconia grains conferring a high S ratio and an improved maximum power $P_{max}$ and/or an improved lifetime $t_{max}$. One aim of the invention is to meet this need.

SUMMARY OF THE INVENTION

According to the invention, this aim is achieved by means of a fused grain exhibiting, in one embodiment, the following chemical analysis, as percentages by weight based on the oxides:

$ZrO_2$: 16% to 30%, provided that $HfO_2<2\%$,
$Al_2O_3$: remainder to 100%.
$Cr_2O_3$: ≥0.2%, preferably >0.4%,
$TiO_2$: ≥0.5%,
$Cr_2O_3+TiO_2$: <7%,
Other elements: <3%, provided that $SiO_2+CaO+MgO<1.5\%$.

In one embodiment, the fused grain exhibits the following chemical analysis, as percentages by weight based on the oxides:

$ZrO_2$: 16% to 30%, provided that $HfO_2<2\%$,
$Al_2O_3$: remainder to 100%,
$Cr_2O_3$: 0.2% to 4%,
$TiO_2$: 0.5% to 6%,
Other elements: <3%, provided that $SiO_2+CaO+MgO<1.5\%$.

As will be seen in more detail in the continuation of the description, the inventors have discovered that, with the above chemical composition and in particular with the combination of $Cr_2O_3$ and $TiO_2$, the machining effectiveness is enhanced.

A grain according to the invention may also exhibit, whatever the above embodiment, one or more of the following optional characteristics:

The $ZrO_2$ content is preferably greater than 17%, preferably greater than 18%, preferably greater than 19%, preferably greater than 20%, preferably greater than 21%, preferably greater than 22% and/or less than 29%, preferably less than 28%, preferably less than 27%, as percentages by weight based on the oxides.

The $Cr_2O_3$ content is preferably greater than 0.5% and/or less than 6.5%, preferably less than 6%, preferably less than 5.5%, preferably less than 5%, preferably less than or equal to 4%, preferably less than 3.8%, preferably less than 3.6%, preferably less than 3.4%, preferably less than 3.2%, preferably less than 3%, preferably less than 2.8%, preferably less than 2.6%, preferably less than 2.4%, preferably less than 2.2%, preferably less than 2%, preferably less than 1.9%, preferably less than 1.8%, preferably less than 1.7%, preferably less than 1.6%, preferably less than 1.5%, as percentages by weight based on the oxides.

In a preferred embodiment, the $TiO_2$ content is preferably greater than 0.6%, preferably greater than 0.7%, preferably greater than 0.8%, preferably greater than 0.9%, preferably greater than 1% and/or less than 6.5%, preferably less than or equal to 6%, preferably less than 5.8%, preferably less than 5.6%, preferably less than 5.4%, preferably less than 5.2%, preferably less than 5%, preferably less than 4.8%, preferably less than 4.6%, preferably less than 4.4%, preferably less than 4.2%, preferably less than 4%, preferably less than 3.8%, preferably less than 3.6%, preferably less than 3.4%, preferably less than 3.2%, preferably less than 3%, preferably less than 2.9%, preferably less than 2.8%, preferably less than 2.7%, preferably less than 2.6%, preferably less than 2.5%, as percentages by weight based on the oxides.

In a preferred embodiment, the $Cr_2O_3+TiO_2$ summed content is preferably greater than 0.9%, preferably greater than 1%, preferably greater than 1.2%, preferably greater than 1.4% and/or less than 6.8%, preferably less than 6.6%, preferably less than 6.4%, preferably less than 6.2%, preferably less than 6%, preferably less than 5.8%, preferably less than 5.6%, preferably less than 5.4%, preferably less than 5.2%, preferably less than 5%, preferably less than 4.8%, preferably less than 4.6%, preferably less than 4.4%, preferably less than 4.2%, preferably less than 4%, preferably less than 3.8%, preferably less than 3.6%, preferably less than 3.4%, preferably less than 3.3%, preferably less than 3.2%, preferably less than 3%, as percentages by weight based on the oxides.

In one embodiment, the $TiO_2$ content is preferably greater than 4%, preferably greater than 4.5%, preferably greater than 5.0% and/or less than 6.5%, preferably less than 6%, and the $Cr_2O_3+TiO_2$ summed content is preferably greater than 4.4%, preferably greater than 4.8%, preferably greater than 5%, preferably greater than 5.5%, preferably greater than 5.8% and/or less than 6.9%, preferably less than 6.6%, preferably less than 6.4%, as percentages by weight based on the oxides.

The "other elements" content is preferably less than 2.8%, preferably less than 2.5%, preferably less than 2.3%, preferably less than 2%, preferably less than 1.5%, preferably less than 1%, as percentages by weight based on the oxides. In particular:
- the $SiO_2$ content is preferably less than 1.4%, preferably less than 1.3%, preferably less than 1.2%, preferably less than 1%, preferably less than 0.8%, preferably less than 0.6%, as percentages by weight based on the oxides; advantageously, the performance qualities of the grain are improved thereby, and/or
- the MgO content is preferably less than 0.5%, preferably less than 0.4%, preferably less than 0.3%, preferably less than 0.2%, as percentages by weight based on the oxides, and/or
- the CaO content is preferably less than 0.5%, preferably less than 0.4%, preferably less than 0.3%, preferably less than 0.2%, as percentages by weight based on the oxides, and/or
- the $Na_2O$ content is preferably less than 0.1%, preferably less than 0.05%, preferably less than 0.03%, preferably less than 0.01%, as percentages by weight based on the oxides; advantageously, the performance qualities of the grain are improved thereby, and/or
- the $SiO_2+CaO+MgO$ summed content is preferably less than 1.3%, preferably less than 1%, preferably less than 0.8%, preferably less than 0.6%, preferably less than 0.5%.

The other elements are preferably impurities.

The oxides content is preferably greater than 90%, preferably greater than 95%, preferably greater than 98%, preferably greater than 99%, as percentages by weight based on the weight of the grain.

The carbon C content is preferably greater than 0.01%, preferably greater than 0.03%, preferably greater than 0.05% and/or less than 0.6%, preferably less than 0.5%, preferably less than 0.4%, preferably less than 0.3%, as percentages by weight based on the weight of the fused grain.

The invention also relates to a mixture of grains comprising, as percentages by weight, more than 80%, preferably more than 90%, preferably more than 95%, preferably more than 99%, preferably substantially 100%, of abrasive grains according to the invention.

Preferably, the mixture of grains according to the invention exhibits a maximum size of less than 4 mm and/or a 10 ($D_{10}$) percentile of greater than 50 μm.

Preferably, the mixture of grains according to the invention observes a particle size distribution in accordance with those of the mixtures or grits measured according to the FEPA Standard 43-GB-1984, R1993.

The invention also relates to a process for the manufacture of a mixture of fused grains according to the invention, comprising the following successive stages:
a) mixing starting materials so as to form a feedstock,
b) melting said feedstock until a molten material is obtained,
c) solidifying said molten material,
d) optionally, and in particular if stage c) does not result in grains being obtained, grinding said solid mass so as to obtain a powder of grains,
e) optionally, particle size selection.

According to the invention, the starting materials are chosen in stage a) so that the solid mass obtained at the end of stage c) exhibits a composition in accordance with that of a grain according to the invention.

The invention also relates to an abrasive tool comprising grains bound by a binder and bonded, for example in the form of a grinding wheel, or deposited on a support, for example deposited as a layer on a flexible support, this tool being noteworthy in that at least a portion, preferably more than 50%, preferably more than 70%, preferably more than 80%, preferably more than 90%, preferably more than 95%, preferably more than 99%, preferably all, of said grains are in accordance with the invention. The abrasive tool may in particular be a truing grinding wheel, a precision grinding wheel, a sharpening grinding wheel, a cut-off grinding wheel, a grinding wheel for machining from the body, a fettling or roughing grinding wheel, a regulating grinding wheel, a portable grinding wheel, a foundry grinding wheel, a drill grinding wheel, a mounted grinding wheel, a cylinder grinding wheel, a cone grinding wheel, a disk grinding wheel or a segmented grinding wheel or any other type of grinding wheel.

Generally, the invention relates to the use of grains according to the invention, in particular in an abrasive tool according to the invention, for abrading.

Definitions

The contents of oxides of a grain according to the invention refer to the overall contents for each of the corresponding chemical elements, expressed in the form of the most stable oxide, according to the standard convention of the industry; the suboxides and optionally nitrides, oxynitrides, carbides, oxycarbides, carbonitrides or even the metallic entities in the abovementioned elements are thus included. Carbon forms part of the "other elements"; its content is thus expressed by the $CO_2$ content.

The term "impurities" is understood to mean the inevitable constituents necessarily introduced with the starting materials. In particular, the compounds forming part of the group of the oxides, nitrides, oxynitrides, carbides, oxycarbides, carbonitrides and metallic entities of sodium and other alkali metals, iron and vanadium are impurities. Mention may be made, by way of examples, of CaO, MgO or $Na_2O$. Hafnium oxide is not regarded as an impurity.

The term "precursor" of an oxide is understood to mean a constituent capable of providing said oxide during the manufacture of a grain or of a mixture of grains according to the invention.

The term "fused grain" or more broadly "fused product" is understood to mean a solid grain (or product) obtained by solidifying, by cooling, a molten material.

A "molten material" is a body, rendered liquid by heating a feedstock, which may comprise a few solid particles but in an amount insufficient for them to be able to give structure to said body. In order to retain its shape, a molten material has to be contained within a receptacle. The fused products based on oxides according to the invention are conventionally obtained by melting at more than 1400° C.

The 10 ($D_{10}$), 50 ($D_{50}$) and 99.5 ($D_{99.5}$) percentiles or "centiles" of a powder are the sizes of particles corresponding to the percentages, by weight, of 10%, 50% and 99.5% respectively, on the cumulative particle size distribution curve of the particles of the powder, the sizes of particles being categorized by increasing order. For example, 10% by weight of the particles of the powder have a size of less than $D_{10}$ and 90% of the particles by weight have a size of greater than $D_{10}$. The percentiles may be determined using a particle size distribution produced using a laser particle sizer.

"Maximum size" refers to the 99.5 ($D_{99.5}$) percentile of said powder.

"Median size" refers to the $D_{50}$ percentile, that is to say to the size dividing the particles into first and second populations equal by weight, these first and second populations comprising only particles exhibiting a size of greater than, or respectively less than, the median size.

In the present description, unless otherwise mentioned, all the compositions of a grain are given as percentages by weight, on the basis of the total weight of the oxides of the grain.

DETAILED DESCRIPTION

The description which follows is provided for illustrative purposes and does not limit the invention.

Fused grains according to the invention may be manufactured according to the abovementioned stages a) to e), which are conventional for the manufacture of alumina-zirconia grains. The parameters may, for example, take the values of the process used for the examples below.

In stage a), starting materials are conventionally metered out, so as to obtain the desired composition, and are then mixed in order to form the feedstock.

The metals Zr, Hf, Al and Ti in the feedstock are found substantially in full in the fused grains.

However, the element chromium may be partially volatilized, in particular in an oxide form, during the melting. A person skilled in the art knows how to consequently adjust the composition of the feedstock.

The metals Zr, Hf, Al, Cr and Ti are preferably introduced into the feedstock in the form of oxides $ZrO_2$, $HfO_2$, $Al_2O_3$, $Cr_2O_3$ and $TiO_2$. They may also be conventionally introduced in the form of precursors of these oxides.

In one embodiment, the feedstock consists of oxides $ZrO_2$, $HfO_2$, $Al_2O_3$, $Cr_2O_3$ and $TiO_2$ and/or of precursors of these oxides, and of a source of carbon.

Preferably, the feedstock comprises an amount of carbon, preferably in the form of coke, of between 1% and 4%, based on the weight of the feedstock.

It is considered that a content of "other elements" of less than 3% in the grains does not suppress the technical effect provided by the invention, provided that $SiO_2+CaO+MgO<1.5\%$.

If $SiO_2+CaO+MgO \geq 1.5\%$, the abrasive performance qualities are inadequate.

The "other elements" are preferably impurities. Preferably, the content of impurities is less than 2%, less than 1%, indeed even less than 0.5%.

In stage b), use is preferably made of an electric arc furnace, preferably of Héroult type with graphite electrodes, but any furnace known may be envisaged, such as an induction furnace or a plasma furnace, provided that they make it possible to melt the feedstock. The starting materials are preferably melted in a reducing environment (with in particular an addition of a source of carbon, for example petroleum coke, pitch or coal, to the furnace), preferably at atmospheric pressure.

Preferably, use is made of an electric arc furnace, comprising a vessel with a capacity of 80 liters, with a melting energy before pouring of at least 1.5 kWh per kg of starting materials for a power of at least 150 kW, or an electric arc furnace with a different capacity employed under equivalent conditions. A person skilled in the art knows how to determine such equivalent conditions.

In stage c), the cooling has to be rapid, that is to say so that the molten material has completely solidified in less than 3 minutes. For example, it may result from a pouring into molds, as described in U.S. Pat. No. 3,993,119, or from a quenching.

If stage c) does not make it possible to obtain a powder of grains, or if these grains do not exhibit a particle size distribution suited to the application targeted, a grinding (stage d)) may be carried out, according to conventional techniques.

In stage e), if the preceding stages do not make it possible to obtain a powder of grains exhibiting a particle size distribution suited to the application targeted, a particle size selection, for example by sieving or cycloning, may be carried out.

The processes for the manufacture of the abrasive tools according to the invention are well known.

The bonded abrasive tools, in particular a grinding wheel, may be formed by pressing into shape a mixture of abrasive grains and of a binder. In an abrasive tool according to the invention, the binder may be vitrified (for example, a binder consisting of oxides, essentially silicate) or organic. An organic binder is highly suitable.

The binder may in particular be a thermosetting resin. It may be chosen from the group consisting of phenolic, epoxy, acrylate, polyester, polyamide, polybenzimidazole, polyurethane, phenoxy, phenol-furfural, aniline-formaldehyde, urea-formaldehyde, cresol-aldehyde, resorcinol-aldehyde, urea-aldehyde or melamine-formaldehyde resins, and mixtures of these.

Usually, the binder represents between 2% and 60%, preferably between 20% and 40%, by volume of the mixture. The binder may also incorporate organic or inorganic fillers, such as hydrated inorganic fillers (for example alumina trihydrate or boehmite) or nonhydrated inorganic fillers (for example molybdenum oxide), cryolite, a halogen, fluorspar, iron sulfide, zinc sulfide, magnesia, silicon carbide, silicon chloride, potassium chloride, manganese dichloride, potassium or zinc fluoroborate, potassium fluoroaluminate, calcium oxide, potassium sulfate, a copolymer of vinylidene chloride and vinyl chloride, polyvinylidene chloride, polyvinyl chloride, fibers, sulfides, chlorides, sulfates, fluorides, and mixtures of these. The binder may also contain reinforcing fibers, such as glass fibers.

Examples

The following nonlimiting examples are given for the purpose of illustrating the invention.

The products given as examples were prepared from the following starting materials:

Alumina powder sold under the name AR75 by Alteo, exhibiting an alumina content of greater than 99.4% and a sodium oxide content of less than 2500 ppm;

Zirconia powder having a mean zirconia content of greater than 85%, containing on average 5% of silica, an alumina content of less than 10%, a hafnium oxide content of less than 2%, a content of other oxides of less than 1% and a maximum size equal to 13 mm;

Titanium oxide powder, "Rutile Sand Premium Grade", sold by Traxys FrancePra, exhibiting a $TiO_2$ content >95%, and 80% by weight of the particles of which exhibit a size of less than 106 µm;

Pigmentary chromium oxide $Cr_2O_3$ powder sold under the name Bayoxide® C GN-R by Lanxess, exhibiting a $Cr_2O_3$ content of greater than 98.5% by weight;

Pitch coke sold by Altichem, with a size of between 1 and 4 mm.

The grains were prepared according to the following conventional process, well known to a person skilled in the art:

a) mixing the starting materials so as to form a feedstock,
b) melting in a single-phase electric arc furnace of Héroult type comprising graphite electrodes, with a furnace vessel having a capacity of 80 liters and a diameter of 0.8 m, a voltage of 145-150V, a current of 1700 A and a specific electrical energy supplied equal to 1.7 kWh/kg charged,
c) sudden cooling of the molten material by means of a device for casting between thin metal plates, such as that presented in the patent U.S. Pat. No. 3,993,119, so as to obtain a completely solid sheet, constituting a solid mass.
d) grinding said solid mass cooled in stage c), so as to obtain a mixture of grains,
e) selection by sieving of the grains between 500 and 600 µm.

The compositions of the feedstocks, as percentages by weight, used in stage a) to manufacture the grains of the different examples are provided in the following table 1.

TABLE 1

| Examples | Alumina powder | Zirconia powder | Titanium oxide powder | Chromium oxide powder | Pitch coke |
|---|---|---|---|---|---|
| Comp1 | 66 | 25.5 | 0 | 6.6 | 1.9 |
| Comp2 | 68.3 | 26.7 | 3 | 0 | 2 |
| Comp3 | 67.5 | 25.5 | 0 | 5.1 | 1.9 |
| 1 | 67.7 | 27 | 2.5 | 0.8 | 2 |
| 2 | 68.5 | 27 | 1.9 | 0.6 | 2 |
| Comp4 | 69 | 27 | 2 | 0 | 2 |
| Comp5 | 59.2 | 23.8 | 0 | 15 | 2 |
| Comp6 | 64.8 | 25.2 | 8 | 0 | 2 |
| 3 | 64.7 | 25.3 | 7 | 1 | 2 |

In order to evaluate the performance qualities and the lifetimes of the mixtures of grains, grinding wheels with a diameter of 12.6 cm, containing 1.02 grams of grains of each example, were produced according to the following method: a disk made of steel of 4140 grade, with a diameter of 12.6 cm and with a thickness equal to 6 mm, is cleaned. The edge face of the disk (defining its thickness) is then covered with a phenolic resin. A single layer of test grains is subsequently deposited uniformly over said resin, which is still sufficiently warm to remain tacky. After drying in a cycle exhibiting a total duration equal to 17 hours and a maximum temperature achieved equal to 175° C., a layer of phenolic resin is applied over the test grains and then the assembly is placed in an oven in a cycle exhibiting a total duration equal to 17 hours and a maximum temperature achieved equal to 175° C., so as to obtain the test grinding wheel.

Plates made of 304 stainless steel, with dimensions of 20.5 cm×7.6 cm×6 cm, were subsequently machined at the surface with these grinding wheels, with a to-and-fro movement at a constant speed while maintaining a constant cutting depth of 40 µm and a rotational speed of the grinding wheel of 3600 rev/min. The maximum power developed by the grinding wheel during the machining, $P_{max}$, was recorded.

After the grinding wheel has been completely worn away, the weight of machined steel (that is to say, the weight of steel removed by the grinding operation), "Ma", and the weight of grinding wheel consumed, "Mm", were measured. The S ratio is equal to the Ma/Mm ratio.

The cutting efficiency is determined by measuring the maximum power developed by the grinding wheel during the machining test, $P_{max}$, and the lifetime of the grinding wheel, $t_{max}$, the lifetime of a grinding wheel being regarded as complete when all the grains of the grinding wheel have been consumed.

The chemical compositions of different mixtures of grains tested are provided in table 2. The results obtained with these mixtures are provided in table 3.

To highlight the respective effects of the titanium oxide and of the chromium oxide, the examples to be compared should exhibit the same total content of these two oxides. Example 1 should thus be compared with comparative example 1 or comparative example 2. Example 2 should thus be compared with comparative example 3 or comparative example 4. Example 3 should be compared with comparative example 5 or comparative example 6.

The percentage of improvement in the S ratio is calculated by the following formula:

100.(S ratio of the product of the example considered−S ratio of the product of the reference example)/S ratio of the product of the reference example, the reference example being comparative example 1 or comparative example 2 for example 1, comparative example 3 or comparative example 4 for example 2, and comparative example 5 or comparative example 6 for example 3.

The percentage of reduction in the maximum power developed by the grinding wheel during the test, $P_{max}$, is calculated by the following formula:

100.($P_{max}$ with the product of the reference example−$P_{max}$ with the product of the example considered)/$P_{max}$ of the product of the reference example, the reference example being comparative example 1, comparative example 2, comparative example 3, comparative example 4, comparative example 5 or comparative example 6, as for the determination of the percentage of improvement in the S ratio. A positive and high value for the percentage of reduction in the maximum power developed by the grinding wheel during the test, $P_{max}$, is desired.

The percentage of improvement in the lifetime of the grinding wheel, $t_{max}$ is calculated by the following formula:

100.($t_{max}$ of the product of the example considered−$t_{max}$ of the product of the reference example)/$t_{max}$ of the product of the reference example, the reference example being comparative example 1, comparative example 2, comparative example 3, comparative example 4, comparative example 5 or comparative example 6, as for the determination of the percentage of improvement in the S ratio. A positive and high value for the percentage of improvement in the lifetime of the grinding wheel, $t_{max}$, is desired.

The results obtained are summarized in the following tables 2, 3 and 4.

Comparative examples 2, 4 and 6 are mixtures of grains according to U.S. Pat. No. 5,143,522 and comparative examples 1, 3 and 5 are mixtures of grains according to U.S. Pat. No. 4,035,162.

The grains of the comparative examples were sieved between 500 and 600 μm.

TABLE 2

| Example | $ZrO_2 + HfO_2$ (%) | $Al_2O_3$ (%) | $Cr_2O_3$ (%) | $TiO_2$ (%) | $Cr_2O_3 + TiO_2$ (%) | Other elements, expressed in the form of oxides (%) | |
|---|---|---|---|---|---|---|---|
| | | | | | | Total | $SiO_2$ |
| Comp1 | 24.4 | Remainder to 100% | 2.54 | 0.10 | 2.64 | <1.23 | 0.53 |
| Comp2 | 26.0 | Remainder to 100% | 0.03 | 2.77 | 2.80 | <1.30 | 0.60 |
| Comp3 | 25.0 | Remainder to 100% | 1.93 | 0.09 | 2.02 | <1.22 | 0.52 |
| 1 | 26.0 | Remainder to 100% | 0.61 | 2.11 | 2.72 | <0.90 | 0.20 |
| 2 | 24.5 | Remainder to 100% | 0.46 | 1.60 | 2.06 | <0.83 | 0.13 |
| Comp4 | 25.9 | Remainder to 100% | 0.01 | 2.19 | 2.19 | <0.65 | 0.30 |
| Comp5 | 24.5 | Remainder to 100% | 6.95 | 0.10 | 7.05 | <0.53 | 0.35 |
| Comp6 | 24.1 | Remainder to 100% | 0.01 | 7.09 | 7.10 | <0.67 | 0.43 |
| 3 | 24.4 | Remainder to 100% | 0.77 | 6.17 | 6.94 | <0.47 | 0.27 |

In all the examples, $Na_2O<0.05\%$, $MgO<0.05\%$, $CaO<0.05\%$, $SiO_2+CaO+MgO<0.8\%$, based on the oxides. Carbon C always represents less than 0.20% of the weight of the grains.

on the other hand
  the maximum power developed, $P_{max}$, is reduced by at least 5%, with respect to the products of the reference examples, and/or
  the lifetime of the grinding wheel, $t_{max}$, is improved by at least 6%, with respect to the products of the reference examples.

Preferably, the S ratio is improved by at least 5%, preferably by at least 10%, preferably by at least 15%, preferably by at least 20%, indeed even by at least 25%, and/or the maximum power developed, $P_{max}$, is reduced by at least 10%, preferably by at least 15%, indeed even by at least 20%, indeed even by at least 25%, and/or the lifetime of the grinding wheel, $t_{max}$, is improved by at least 10%, preferably by at least 15%, indeed even by at least 20%.

TABLE 3

| Example | S ratio | | | $P_{max}$ | | | $t_{max}$ | | |
|---|---|---|---|---|---|---|---|---|---|
| | % of improvement/ example comp1 | % of improvement/ example comp2 | % of improvement/ example comp3 | % of reduction/ example comp1 | % of reduction/ example comp2 | % of reduction/ example comp3 | % of improvement/ example comp1 | % of improvement/ example comp2 | % of improvement/ example comp3 |
| 1 | 40 | 3 | — | 23 | 9 | — | 14 | 17 | — |
| 2 | — | — | 56 | — | — | 33 | — | — | 37 |

TABLE 4

| Example | S ratio | | | $P_{max}$ | | | $t_{max}$ | | |
|---|---|---|---|---|---|---|---|---|---|
| | % of improvement/ example comp4 | % of improvement/ example comp5 | % of improvement/ example comp6 | % of reduction/ example comp4 | % of reduction/ example comp5 | % of reduction/ example comp6 | % of improvement/ example comp4 | % of improvement/ example comp5 | % of improvement/ example comp6 |
| 2 | 5 | — | — | 25 | — | — | 28 | — | — |
| 3 | — | 25 | 1 | — | 14 | 13 | — | 20 | 22 |

The inventors consider that there exists a good compromise between the S ratio, the maximum power developed by the grinding wheel during the machining test, $P_{max}$, and the lifetime of the grinding wheel, $t_{max}$, when:
  on the one hand, the S ratio is identical to or greater than the products of the reference examples, and A comparison of examples 1 and comp1 shows the importance of a minimum $TiO_2$ content, for a $Cr_2O_3+TiO_2$ sum of approximately 2.7%: the S ratio is improved by 40%, $P_{max}$ is reduced by 23% and $t_{max}$ is improved by 14%.

A comparison of examples 2 and comp3 also shows the importance of a minimum $TiO_2$ content, for a $Cr_2O_3+TiO_2$ sum of approximately 2.1%: the S ratio is improved by 56%, $P_{max}$ is reduced by 33% and $t_{max}$ is improved by 37%.

A comparison of examples 3 and comp5 also shows the importance of a minimum $TiO_2$ content, for a $Cr_2O_3+TiO_2$ sum of approximately 7.0%: the S ratio is improved by 25%, $P_{max}$ is reduced by 14% and $t_{max}$ is improved by 20%.

A comparison of examples 1 and comp2 shows the importance of a minimum $Cr_2O_3$ content: the S ratio is improved by 3%, $P_{max}$ is reduced by 9% and $t_{max}$ is improved by 17%.

A comparison of examples 2 and comp4 also shows the importance of a minimum $Cr_2O_3$ content: the S ratio is improved by 5%, $P_{max}$ is reduced by 25% and $t_{max}$ is improved by 28%.

A comparison of examples 3 and comp6 also shows the importance of a minimum $Cr_2O_3$ content: the S ratio is improved by 1%, $P_{max}$ is reduced by 13% and $t_{max}$ is improved by 22%.

Examples 1, 2 and 3 according to the invention thus observe the desired compromise.

These comparisons clearly show the advantage of the simultaneous presence of $Cr_2O_3$ and $TiO_2$ within the claimed ranges.

As is now clearly apparent, the invention provides a mixture of abrasive fused alumina-zirconia grains exhibiting an exceptional abrasive performance, an exceptional endurance and an exceptional cutting efficiency.

Of course, the present invention is not, however, limited to the embodiments described and represented, which are provided by way of illustrative and nonlimiting examples.

The invention claimed is:

1. A fused grain exhibiting the following chemical analysis, as percentages by weight based on the oxides:
   $ZrO_2$: 16% to 30%, provided that $HfO_2$<2%,
   $Al_2O_3$: remainder to 100%,
   $Cr_2O_3$: ≥0.2% and ≤4%,
   $TiO_2$: ≥0.5%,
   $Cr_2O_3+TiO_2$: <7%,
   Other elements: <3%, provided that $SiO_2+CaO+MgO$<1.5%.

2. The grain as claimed in claim 1, in which $Cr_2O_3$>0.4%.

3. The grain as claimed in claim 1, in which
   the $TiO_2$ content is less than or equal to 6%,
   as percentages by weight based on the oxides.

4. The grain as claimed in claim 1,
   in which the $ZrO_2$ content is greater than 18%, and/or
   in which the $Cr_2O_3$ content is greater than 0.5%, and/or
   in which the $TiO_2$ content is greater than 0.8%,
   as percentages by weight based on the oxides.

5. The grain as claimed in claim 4,
   in which the $ZrO_2$ content is greater than 20%, and/or
   in which the $TiO_2$ content is greater than 1%,
   as percentages by weight based on the oxides.

6. The grain as claimed in claim 1,
   in which the $ZrO_2$ content is less than 29%, and/or
   in which the $Cr_2O_3$ content is less than 3.2%, and/or
   in which the $TiO_2$ content is less than 4.4%,
   as percentages by weight based on the oxides.

7. The grain as claimed claim 6,
   in which the $ZrO_2$ content is less than 27%, and/or
   in which the $Cr_2O_3$ content is less than 2.2%, and/or
   in which the $TiO_2$ content is less than 2.8%,
   as percentages by weight based on the oxides.

8. The grain as claimed in claim 1, in which the $Cr_2O_3+TiO_2$ summed content is greater than 1.5% and less than 3.3%, as percentages by weight based on the oxides.

9. The grain as claimed in claim 1,
   in which the $TiO_2$ content is greater than 4% and less than 6.5%, and
   in which the $Cr_2O_3+TiO_2$ summed content is greater than 4.4% and preferably less than 6.9%,
   as percentages by weight based on the oxides.

10. The grain as claimed in claim 1, in which the content of other elements is less than 2%, as percentages by weight based on the oxides.

11. The grain as claimed in claim 1, in which the $SiO_2+CaO+MgO$ content is less than 1%.

12. The grain as claimed in claim 1, in which
    the $SiO_2$ content is less than 1%, and/or
    the MgO content is less than 0.5%, and/or
    the CaO content is less than 0.5%, and/or
    the $Na_2O$ content is less than 0.1%,
    as percentages by weight based on the oxides.

13. The grain as claimed in claim 12, in which
    the $SiO_2$ content is less than 0.8%, and/or
    the MgO content is less than 0.3%, and/or
    the CaO content is less than 0.3%, and/or
    the $Na_2O$ content is less than 0.05%,
    as percentages by weight based on the oxides.

14. A mixture of grains comprising, as percentages by weight, more than 80% of abrasive grains as claimed in claim 1.

15. An abrasive tool comprising grains bound by a binder, bonded or deposited on a support, at least a portion of said grains being in accordance with claim 1.

16. The abrasive tool as claimed in claim 15, wherein said at least a portion of said grains comprising more than 80% of said grains.

17. The abrasive tool as claimed in claim 15, which is provided in the form of a grinding wheel.

18. The grain as claimed in claim 10, in which the content of other elements is less than 1%, as percentages by weight based on the oxides.

19. The grain as claimed in claim 11, in which the $SiO_2+CaO+MgO$ content is less than 0.8%.

20. A fused grain exhibiting the following chemical analysis, as percentages by weight based on the oxides:
    $ZrO_2$: 16% to 30%, provided that $HfO_2$<2%,
    $Al_2O_3$: remainder to 100%,
    $Cr_2O_3$: ≥0.2%,
    $TiO_2$: ≥0.5%,
    $Cr_2O_3+TiO_2$: <5.2%,
    Other elements: <3%, provided that $SiO_2+CaO+MgO$<1.5%.

21. The grain as claimed in claim 20, in which $Cr_2O_3+TiO_2$<4%.

22. The grain as claimed in claim 20, in which $Cr_2O_3+TiO_2$<3.3%.

23. A fused grain exhibiting the following chemical analysis, as percentages by weight based on the oxides:
    $ZrO_2$: 16% to 30%, provided that $HfO_2$<2%,
    $Al_2O_3$: remainder to 100%,
    $Cr_2O_3$: ≥0.2%.
    $TiO_2$: ≥4%,
    $Cr_2O_3+TiO_2$: <7%,
    Other elements: <3%, provided that $SiO_2+CaO+MgO$ <1.5%.

24. The grain as claimed in claim 23, in which $TiO_2<6.5\%$.

* * * * *